Sept. 15, 1936.  J. A. BRUCE  2,054,494
PACKAGING PROCESS FOR BEVERAGES
Filed Sept. 6, 1935
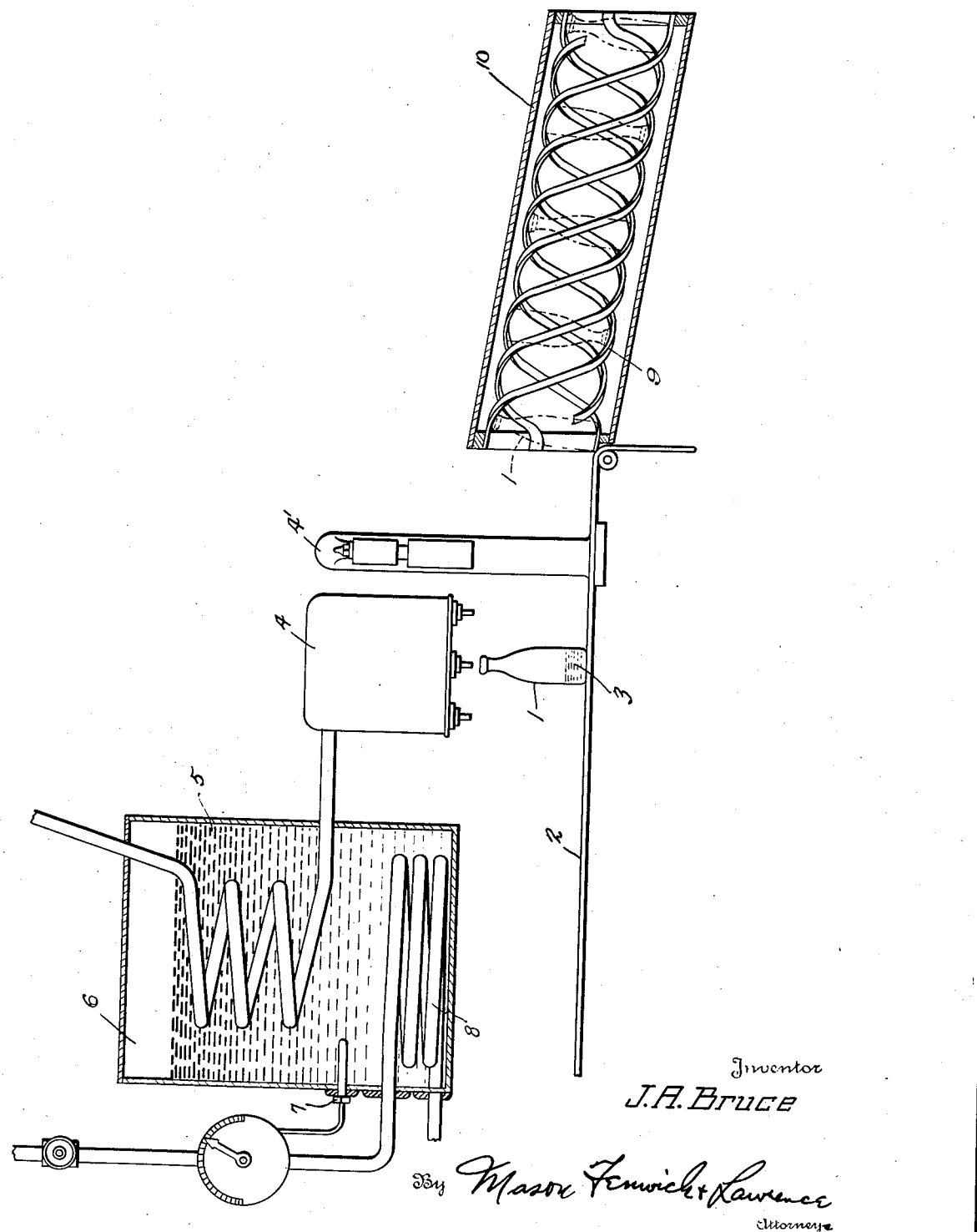
Inventor
J. A. Bruce
By Mason Fenwick & Lawrence
Attorneys Patented Sept. 15, 1936

2,054,494

UNITED STATES PATENT OFFICE 2,054,494

PACKAGING PROCESS FOR BEVERAGES

John A. Bruce, Tampa, Fla.

Application September 6, 1935, Serial No. 39,485

7 Claims. (Cl. 99—215)

This invention relates to the bottling or airtight packaging of beverages, and particularly such as consist in whole or in part of fruit juices, or other fermentable ingredients, and which require some special treatment to prevent fermentation.

The universal bottling of beverages has developed a standard equipment and method of procedure which does not have within its purview the coping with the problem of fermentation which the bottling of beverages containing natural fruit juices or other fermentable products presents.

Up to the present invention, there were various methods of treatment in the bottling of beverages containing fermentable ingredients, two of which are cited herein. All these methods have objectionable features which have greatly restricted the consumption of this type of beverage, although the public has shown real appetite for them. One method was to control fermentation and prevent spoilage by the use of a preservative chemical such as, for example, sodium benzoate.

This method is unsatisfactory on account of taste imparted to the product by the preservative; also, the necessity of carrying on the label notice of the fact that a preservative has been used.

Another method is to bottle the beverage in the usual manner with or without carbonation, and then sterilize the beverage in the bottles in a tank or retort after the bottles have been sealed. The principal objections to this method are from the standpoint of expense and re-organization of equipment, the time necessary to await the completion of sterilization of the beverage, and the additional factory space required.

The present invention is adapted to the packaging of beverages in cans as well as in bottles, since the process concerns itself primarily with the treatment of the product and only secondarily with the nature of the container.

The present invention has for one of its objects the method of bottling or canning beverages in which fruit juices or other fermentable products form an ingredient which employs no chemical preservative, and which requires only a minimum deviation from the equipment used in commercial practice in the bottling industry and which is, therefore, free from the objections which have retarded the expansion of this phase of the bottling business.

Another object of the invention is to preserve the natural flavors of the fresh fruit juices and other ingredients which deteriorate if subjected to a temperature materially higher than sterilization temperature over a long period of time by bringing them from a cold state immediately up to sterilizing temperature by directly mixing with them a quantity of liquid at such temperature above the boiling point to make the average temperature of the mixture, uniformly throughout, the correct sterilizing temperature which the fruit juices and other perishable ingredients can endure for as long a time as is necessary for safe sterilization.

A collateral object of the present invention is to employ the process to conserve the volatile constituents of a beverage or such ingredients as cannot stand high heat for a long time without deterioration, even though no fermentable constituents may be present.

The present usual method of bottling beverages is to throw a stated quantity of bottler's syrup consisting of flavor-giving material such, for example, as sugar syrup, acid, essential oils, concentrates, etc., into the bottle, then fill the bottle with water impregnated, or not, with carbon dioxide as desired. Preservative, if used, would have been added to the bottler's syrup.

The present invention contemplates throwing into the bottle such of the ingredients of the beverage as may require special handling, such as, for example, volatile flavoring materials, and generally the fruit juice or other fermentable ingredients of the beverage at room or any other desired relatively low temperature, and then adding the remaining ingredients of the beverage at such high temperature that the mean temperature of the whole contents of the bottle will be at approximately pasteurizing or sterilizing temperature at some point in the process at or subsequent to the time when the said ingredients are brought together.

In the drawing which accompanies and forms part of the following specification, the sole figure is a diagrammatic representation of additions that might be made to the conventional beverage bottling equipment to adapt it to the process of the present invention in which, referring in detail to this drawing, the numeral 1 represents the bottle on conveyor 2, which has travelled in the direction of the arrow from a source not shown, where it had been sterilized by some suitable means, and if desired had received a charge 3 of certain ingredients of the beverage such as flavoring materials, etc. The bottle 1 passes into a conventional form of bottle filler and capping unit or units 4 and 4', respectively, the supply to which passes through the coil 5, which is positioned in the tank 6. The tank 6 contains water in contact with the coil 5, and by means of thermal control 7, and steam line 8, is maintained at a predetermined temperature to cause the ingredients of the beverage passing through the coil 5 to be discharged into the bottle 1 from the charging unit 4, at a temperature sufficient for sterilization and pasteurization as mentioned in this specification.

After filling and capping, the bottle 1 may be agitated by some simple device as the 360° twist 9. For conveniently sterilizing all parts of the bottle this twist might be enclosed in some sort of steam box 10, after which the bottle will pass on for casing and stacking in the conventional manner.

The first ingredients placed in the bottle or can may be at relatively low temperature, for example, normal temperature or even lower, the remaining ingredients being added at a temperature sufficiently high to cause the mean temperature of the beverage within the filled bottle to be at least at pasteurization or sterilization temperature as desired.

It is preferable that the bottle should not be quite full so that it may be agitated in any suitable manner which will bring the heated ingredients in contact with all parts of the bottle and the other ingredients therein in the briefest interval of time.

According to the usual process of preserving bottled beverages, the bottle with its contents at room temperature or lower would be immersed in a steam kettle and surrounded by boiling water under pressure at a temperature of perhaps 220° Fahrenheit. It would take some time for the liquid in the middle of the bottle to be raised to the boiling point of water. In the meantime, the liquid adjacent to surface of the bottle would be elevated to a temperature of 220°, the liquid closer to the center to 215°, and after the temperature at the middle of the bottle has been raised to 212°, it must be kept at this temperature while the outlying masses of liquid are still subjected to an excess temperature. This means that the fresh fruit juices and other perishable ingredients in all but the very center of the bottle is subjected to a high temperature at which the flavoring principles deteriorate. By the present process, the injection of the heated liquid into the body of fresh fruit juices or other perishable ingredients at room temperature within the bottle creates a natural agitation which mixes the liquids and brings the average temperature down to the sterilization point. Perfect mixture is further immediately accomplished when the bottles are carried by the conveyor into the twist 9 where the bottles are upset.

As ancillary to the process of invention the bottle may be thoroughly sterilized and kept at a high temperature by passing it through a hot water bath or steam jet at any place in the operation of this process, that is, before filling, while being filled and sealed, or after being filled and sealed.

If desired, certain or all ingredients of the beverage may be sterilized independently, or all the ingredients may be mixed and sterilized or pasteurized before being discharged into the bottle.

It will be understood from the above exposition that the process constituting the present invention is adaptable to the conventional beverage bottling or canning system and plant by the addition to said plant of certain convenient and inexpensive pieces of equipment.

It will, therefore, be understood that the details of the process as described are by way of example and not to be construed as limiting the scope of the invention as claimed.

What I claim is:

1. Packaging process for fermentable beverages comprising partially filling a container with some of the ingredients of the beverage at less than bactericidal temperature, and completing the filling of the container with the remaining ingredients of the beverage at a temperature sufficiently higher than bactericidal temperature to make the temperature of the aggregate volume of liquid in the container higher than bactericidal temperature.

2. Packaging process for fermentable beverages comprising partially filling a container with some of the ingredients of the beverage at less than bactericidal temperature, and completing the filling of the container with the remaining ingredients of the beverage at a temperature sufficiently higher than bactericidal temperature to make the temperature of the aggregate volume of liquid in the container higher than bactericidal temperature, and immediately sealing the container.

3. Packaging process for fermentable beverages comprising partially filling a container with some of the ingredients of the beverage, and completing the filling of the container with the remaining ingredients of the beverage at a temperature sufficiently higher than sterilizing temperature, to make the temperature of the aggregate volume of liquid in the container higher than sterilizing temperature, and immediately sealing the container.

4. Packaging process for fermentable beverages comprising the introduction of the ingredients in separate batches into a container at different temperatures one lower than bactericidal temperature and the other at a temperature sufficiently above bactericidal temperature such that the average temperature resulting from the bringing together of all the ingredients, is higher than bactericidal and sterilizing temperature, such ingredient or ingredients as would be impaired by the higher temperature being included in the low temperature batch, and immediately sealing the container.

5. Packaging process for fermentable beverages comprising partially filling a container with some of the constituents of the beverage at relatively low temperature, and completing the filling of the container at a sufficiently high temperature to make the temperature of the aggregate volume of beverage in the container higher than sterilizing temperature, immediately sealing the container, and immediately agitating it in any suitable manner so as to bring the heated ingredients in contact with all parts of the container and the other ingredients therein.

6. Packaging process for fermentable beverages comprising partially filling a container with certain ingredients of the beverage at a temperature lower than sterilizing temperature, completing the filling of the container with ingredients of the beverage which have been brought to a temperature sufficiently high so that when mixed with the ingredients first placed in the container the temperature of the aggregate volume of beverage in the container will be at, or greater than, the temperature of sterilization, sealing the container, applying heat sufficient to sterilize the container, and immediately agitating it in any suitable manner so as to bring the heated ingredients into contact with all parts of the container.

7. Packaging process for fermentable beverages comprising partially filling a container with some of the ingredients of the beverage at less than bactericidal temperature and complete the filling of the container with the remaining ingredients of the beverage at a temperature sufficiently higher than bactericidal temperature to make the temperature of the aggregate volume of liquid in the container higher than bactericidal temperature, such ingredient or ingredients as would be impaired by the higher temperature being included among the low temperature ingredients.

JOHN A. BRUCE.